United States Patent
Jones et al.

(10) Patent No.: US 10,643,264 B2
(45) Date of Patent: May 5, 2020

(54) METHOD AND COMPUTER READABLE MEDIUM FOR PRESENTATION OF CONTENT ITEMS SYNCHRONIZED WITH MEDIA DISPLAY

(71) Applicant: Facebook, Inc., Menlo Park, CA (US)

(72) Inventors: Christopher William Jones, Mill Valley, CA (US); Mark Gerard D'Arcy, New York, NY (US); Ji Byol Lee, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 598 days.

(21) Appl. No.: 15/218,319

(22) Filed: Jul. 25, 2016

(65) Prior Publication Data

US 2018/0025405 A1 Jan. 25, 2018

(51) Int. Cl.
*G06Q 30/00* (2012.01)
*G06Q 30/06* (2012.01)
*G06K 9/00* (2006.01)
*H04N 21/45* (2011.01)

(52) U.S. Cl.
CPC ..... *G06Q 30/0631* (2013.01); *G06K 9/00744* (2013.01); *G06Q 30/0633* (2013.01); *G06Q 30/0643* (2013.01); *H04N 21/4532* (2013.01)

(58) Field of Classification Search
CPC .................................... G06Q 30/0601–0645
USPC ................................................ 705/26.1–27.2
See application file for complete search history.

(56) References Cited

U.S. PATENT DOCUMENTS 9,349,076 B1  5/2016 Liu et al.
9,355,330 B2 * 5/2016 Chua ..................... G06K 9/00
9,805,766 B1 * 10/2017 Peng ........................ H04N 5/77
10,021,458 B1 * 7/2018 Taylor .............. H04N 21/47815
725/32
2011/0162002 A1  6/2011 Jones et al.
(Continued)

FOREIGN PATENT DOCUMENTS

WO   WO 2013/095416 A1   6/2013

OTHER PUBLICATIONS

Hu, Weiming, et al. "A Survey on Visual Content-Based Video Indexing and Retrieval." IEEE Transactions on Systems Man and Cybernetics Part C—Applications and Reviews 41.6 (2011): 797-819. ProQuest. Web. Jan. 2, 2020. (Year: 2011).*

(Continued)

*Primary Examiner* — Jeffrey A. Smith
*Assistant Examiner* — Kennedy Gibson-Wynn
(74) *Attorney, Agent, or Firm* — Fenwick & West LLP

(57) ABSTRACT

An online system displays relevant products along with a video watched by a user in a synchronized manner, which allows the user to explore relevant content (e.g., products recommended to the user) while the user is watching the video. The online system receives a video including a sequence of video frames to be displayed to the user, and the video may be associated with a specific theme, e.g., a soccer game, and one or more video frames may include points of interest (referred as "Q points"). The online system detects or receives Q points associated with corresponding video frames, where a Q point in a video frame identifies an object of interest in the video frame. The online system also correlates user profile information of the user with the detected points to select relevant products tailored to the user.

20 Claims, 5 Drawing Sheets

(56) References Cited

U.S. PATENT DOCUMENTS

| | | | | |
|---|---|---|---|---|
| 2011/0307294 | A1* | 12/2011 | Barkai | G06Q 99/00 |
| | | | | 705/7.29 |
| 2013/0121527 | A1 | 5/2013 | Chambers et al. | |
| 2014/0067969 | A1 | 3/2014 | Archibong et al. | |
| 2015/0245103 | A1* | 8/2015 | Conte | H04N 21/478 |
| 2016/0005097 | A1* | 1/2016 | Hsiao | G06Q 30/06 |
| 2016/0110607 | A1* | 4/2016 | Fuzell-Casey | G06K 9/00 |
| 2017/0364991 | A1* | 12/2017 | Noguchi | G06Q 30/06 |

OTHER PUBLICATIONS

PCT International Search Report and Written Opinion, PCT Application No. PCT/US2017/043529, dated Oct. 30, 2017, 15 pages.

\* cited by examiner

METHOD AND COMPUTER READABLE MEDIUM FOR PRESENTATION OF CONTENT ITEMS SYNCHRONIZED WITH MEDIA DISPLAY

BACKGROUND

This disclosure relates generally to online content distribution, and more specifically to presentation of relevant content items to a user synchronized with media (e.g., a video) being viewed or watched by the user.

Content providers produce content that is targeted to certain audiences within online systems. Users interact with content received from the online system. With the advent of online systems such as social networking systems, content providers have increasingly relied on the online systems to create effective sponsored content within the online system to greatly increase engagement among users of the online systems. For example, a user may use a user device (e.g., a smartphone) to watch videos, e.g., a live broadcast video of soccer games or a prerecorded video of soccer games, and the user may be interested in some products that are presented in the video (e.g., sports jersey a player in the soccer game is wearing) and want to learn more about the products while watching the video, for example, the price of the products. Additionally, the viewing user may be interested in purchasing products presented in the video after watching the video, but he/she may be unable to recall all the products in which he/she was interested while watching the video. However, current solutions of online content distribution do not provide a platform that enables users to watch a video or an online event (e.g., live video streaming of an event or a prerecorded video from a content provider) while exploring relevant products that are likely of interest to the users in a synchronized way.

Figure 1:
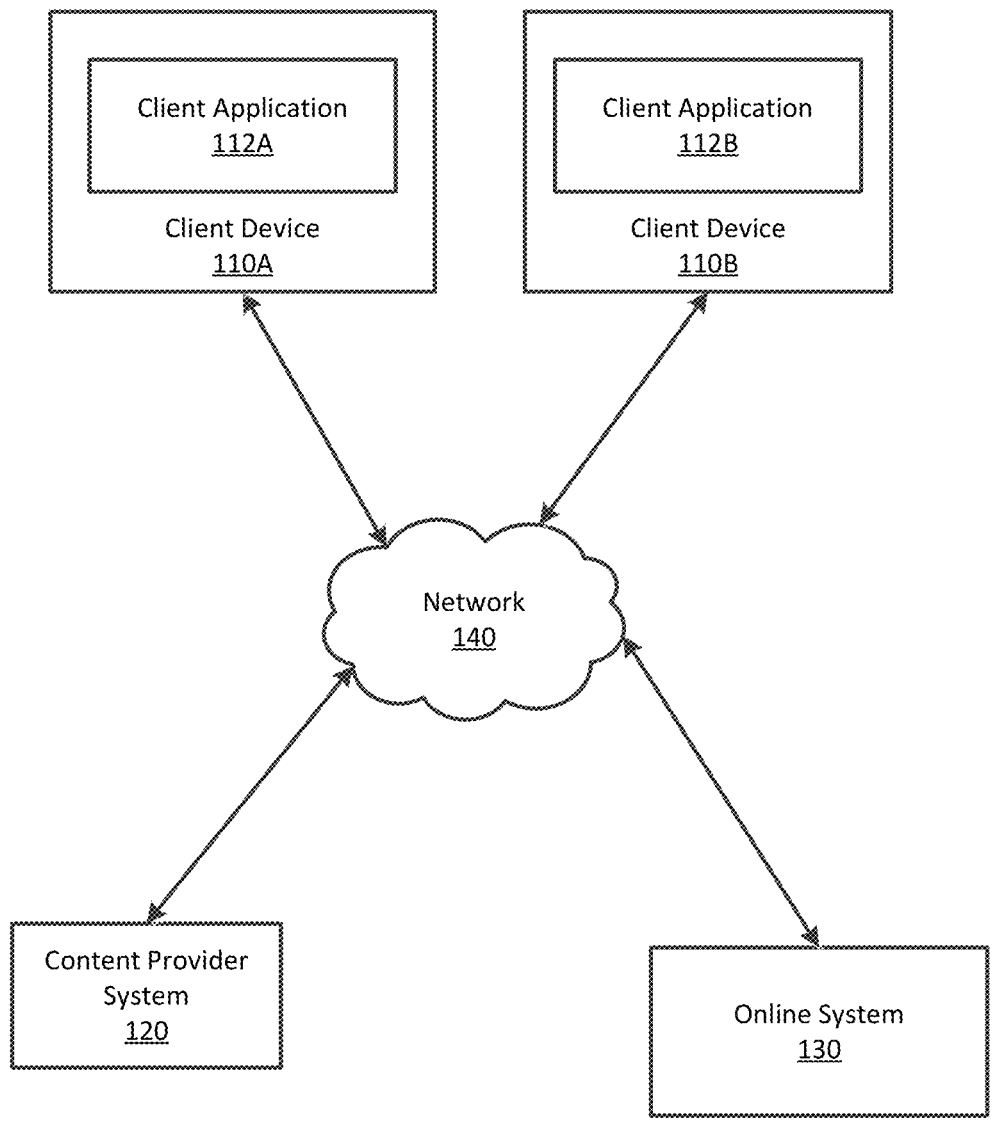
FIG. 1 is a block diagram of a system environment for presentation of recommended products in synchronization with display of a video to a user, according to one embodiment.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality

SUMMARY

Embodiments of the disclosure include a system (or a computer implemented method or a non-transitory computer readable medium) for presentation of recommended products along with media content, such as a video, that is viewed or watched by a user in a synchronized way. For example, an online system provides for display to a user a video along with a scrolling carousel of relevant products (e.g., sponsored content items) that is synchronized with the video such that the products shown in the video are included in the carousel, and the user can select the displayed products for purchase.

An embodiment of the method comprises receiving a video including a sequence of video frames to be displayed to a user. The input video may be a live broadcast video, or a pre-recorded video provided by a content provider. The video may be associated with a specific theme, e.g., a soccer game, and one or more video frames may include points of interest. A point of interest (also referred to as "Q point") herein refers to an object displayed in a video frame of the received video that is related to certain products that are likely of interest to the user. An example point of interest in a baseball game video can be a pair of baseball shoes of a specific brand worn by a baseball player captured in a corresponding video frame of the received video. In one embodiment, the disclosed method detects Q points associated with corresponding video frames included in the input video. In other embodiments, the Q points associated with corresponding video frames are selected by an editor, who analyzes the video for the synchronized display with relevant products. A Q point detected in a video frame has an index (e.g., timestamp or frame number) indicating the corresponding video frame. For example, a Q point that is associated with the $200^{th}$ video frame included in the received video may identify a shirt of a popular brand worn by a player captured in that video frame.

The disclosed method selects relevant products based on the detected Q points in the corresponding video frames. Taking example shown above, the disclosed method may select a shirt of the same brand and same style as the shirt worn by the player in the corresponding video frame as a recommended product, and may select additional products such as shoes or pants of the same brand as recommended products for presentation to the user. In some embodiments, the disclosed method correlates user profile information of the user with the detected Q points, and selects one or more relevant products associated with the detected Q points based on the correlation, which allows better matching between the user's preferences and the recommended products as well as enhanced user experience with the online system. As one example, the disclosed method selects only women's clothes after determining the user is female based on her user profile information. The disclosed method provides for display to the user the video along with a scrolling carousel of selected products (e.g., sponsored content items) in a synchronized manner such that the user can select the products included in the carousel for purchase or for bookmarking.

The disclosed method for presentation of recommended products in a synchronized manner with a video that is watched by a user provides a variety of benefits to the user and content providers providing the recommended products. First, the disclosed method enables users of the online system to "watch and shop" at the same time, allowing the user to access and explore recommended products associated with the video that he/she is currently watching. Second, compared with randomly selected products for recommendation to the user, the disclosed method enables better targeting of the user when presenting to the user products that the user may be more likely to be interested in or that better match the user's preferences in accordance with the user profile information. Third, the disclosed method enables fast generation and presentation of recommended products associated with the video by storing the information describing the recommended products locally in a storage of the online system. Additionally, the disclosed method allows for a better content distribution service for content providers (e.g., advertisers) that are interested in using video as a vehicle to drive mid-funnel consideration and low-funnel product sales of their products and/or services.

DETAILED DESCRIPTION OF THE FIGURES

FIG. 1 is a block diagram of a system environment 100 for presentation of recommended products in synchronization with display of a video to a user, according to one embodiment. In FIG. 1, the system environment 100 includes one or more client devices 110A-110B, a content provider system 120, and an online system 130 connected over a network 140. Only two client devices 110A-110B, one content provider system 120, and one online system 130 are shown in FIG. 1 for purpose of illustration. Other embodiments of the system environment 100 can have multiple client devices 110, multiple content provider systems 120 and multiple online systems 130 through the network 140. Additionally, in other embodiments not shown, functions performed by the online system 130 are realized by software applications (e.g., client applications 112A-112B) executed on the client devices 110A-110B. Likewise, the functions performed by the various entities of FIG. 1 may differ in different embodiments.

A client device 110 is an electronic device used by a user to perform functions such as, consuming digital content (e.g., watching a video displayed on the client device), executing software applications, browsing websites hosted by web servers on the network 140, purchasing the recommended products, and the like. Example client devices 110 include a smart phone, or tablet, laptop, or desktop computer. The client device 110 also includes and/or interfaces with a display device on which the user may view videos and other content. Additionally, the client device 110 provides a user interface (UI), such as physical and/or on-screen buttons, with which the user may interact with the client device 110 to perform functions such as viewing, selecting, and consuming digital content.

In one embodiment, each of the client devices 110 further includes a client application 112 executed on the client device 110 that allows the user to play a video and interact with the video or with the recommended products displayed concurrent with the video. For example, the client application 112 receives a request from a user of the client device 110 for watching a specific video, and the client application receives instructions from the online system 130 for presenting the requested video as well as products recommended for the requested video. The client application 112 also allows the user to pause, stop or replay the video, and allows the user to interact with the recommended products while watching the video, e.g., clicking on a button/drag an image of a recommended product, bookmarking the recommended product for later viewing and navigation or for immediate purchasing of the recommended product. For example, after the user interacts with a recommended product item (e.g., clicks on a button), the recommended product is bookmarked while the video keeps playing without any pause, which enables the user to continuously watch the video without any interruption of the video playback. In yet another example, the user may be directed to an external webpage that has detailed information of the recommended product (e.g., a webpage for shopping cart for the recommended product or an official website of the brand of the recommended product) with or without the video being paused, as more fully described below.

In some embodiments, the client application 112 also allows the user to register with the online system 130, to create personal user profiles on the online system 130, and to access and interact with content provided by the online system 130. The user profile of a user may indicate user's preference information or personal interest (e.g., purchasing interest) of the user. In one embodiment, the client application 112 provides user profile information of the user of the video to the online system 130 for recommending products tailored to the user in accordance to the user's preferences or personal interest.

The content provider system 120 is an online system that provides content to the online system 130 as well as to the client devices 110, and the content provider system 120 may include different content providers (e.g., advertisers, online distributors). In one embodiment, the content provider system 120 provides content items promoting its products, services and brand names. For example, a content provider (e.g., a retailer or a brand owner) using the content provider system 120 provides a video to the online system for display to a user targeted by the content provider. The products described by the content items become candidate products for display to a user watching a video having a relevant theme shared by the candidate products, e.g., soccer shoes for a video of soccer game.

Further, the content provider of the content provider system 120 provides detailed information of the products described by the content items. Example detailed information includes product description such as information about the brand, released date, sizes, prices of the recommended products and images of a product in different colors and sizes. The webpage for a shopping cart and the official website of the brand of a product described above include detailed information of the recommended products. In some embodiments, the detailed information of the products described by the content items is provided to the online system 130 for generating presentation of recommended products to the user in synchronized display of a video watched by a user.

In some embodiments, the content provider system 120 may also provide to the online system 130 information like fashion updates from a variety of sources (e.g., newspapers, live broadcast programs, magazines), and the fashion updates may indicate current fashion trend. The fashion updates may be used for better selection of recommended products to a user, as described below.

The online system 130 instructs a client device 110 of a user to display a video along with a set of recommended products with the video that is watched by the user, e.g., displaying the set of recommended products in a scrolling carousel under the display of the video. The online system 130 detects points of interests or Q points in the video frames of the video or receives the Q points in the video frames selected by an editor of the video and identifies the products related to the detected Q points. As described above, a Q point identifies a specific object of interest that is captured in a corresponding video frame of the video, and the location of a Q point can be indicated by the timestamp or frame number of the corresponding video frame. Example objects of interest identified by Q points include clothes (e.g., shirts, pants) worn by a player captured in the video frame containing the Q points. For example, for a video about a golf game, an object of interest identified by a corresponding Q point can be a golf club shaft with a specific color, type or brand that is held by a player captured in a corresponding video frame. In some embodiments, the online system 130 may determine only one Q point identifying one object of interest in a video frame.

Based on the detected Q points, the online system 130 requests and collects detailed information about the objects of interest identified by the detected Q points from its own database or from external sources, e.g., websites of content providers. As one example, the online system 130 analyzes the detailed information (e.g., brand name, price) about products described by the content items received from the content provider system 130, and based on the received detailed information as well as user profile information associated with the user watching the video, the online system 130 selects one or more products for display to the user along with the video being watched by the user, and the selected specific products for such display with the video are also referred as "recommended products.

The online system 130 selects, assembles and/or arranges the detailed information (e.g., brand name, price, image) about the recommended products and provides to the client device 110 a presentation of the recommended products concurrent with the video displayed to the user.

While providing to the client device 110 the recommended products associated with the video displayed on the client device 110 for a user, the online system 130 can also process requests from the user via the client device 110. As one example, when a viewing user interacts with the a recommended product while watching the video by, e.g., clicking on a "buy now" button or dragging a recommended product image, as more fully described below in FIG. 3A, the online system 130 provides instructions to the client device 110 to direct the user to an external webpage for purchasing the product with or without interrupting the video that is currently watched by the user.

The network 140 enables communications among the client devices 110, the content provider system 120 and the online system 130. In one embodiment, the network 140 comprises the Internet and uses standard communications technologies and/or protocols, e.g., clouding computing. In another embodiment, the network 140 can use custom and/or dedicated data communications technologies.

Figure 2:
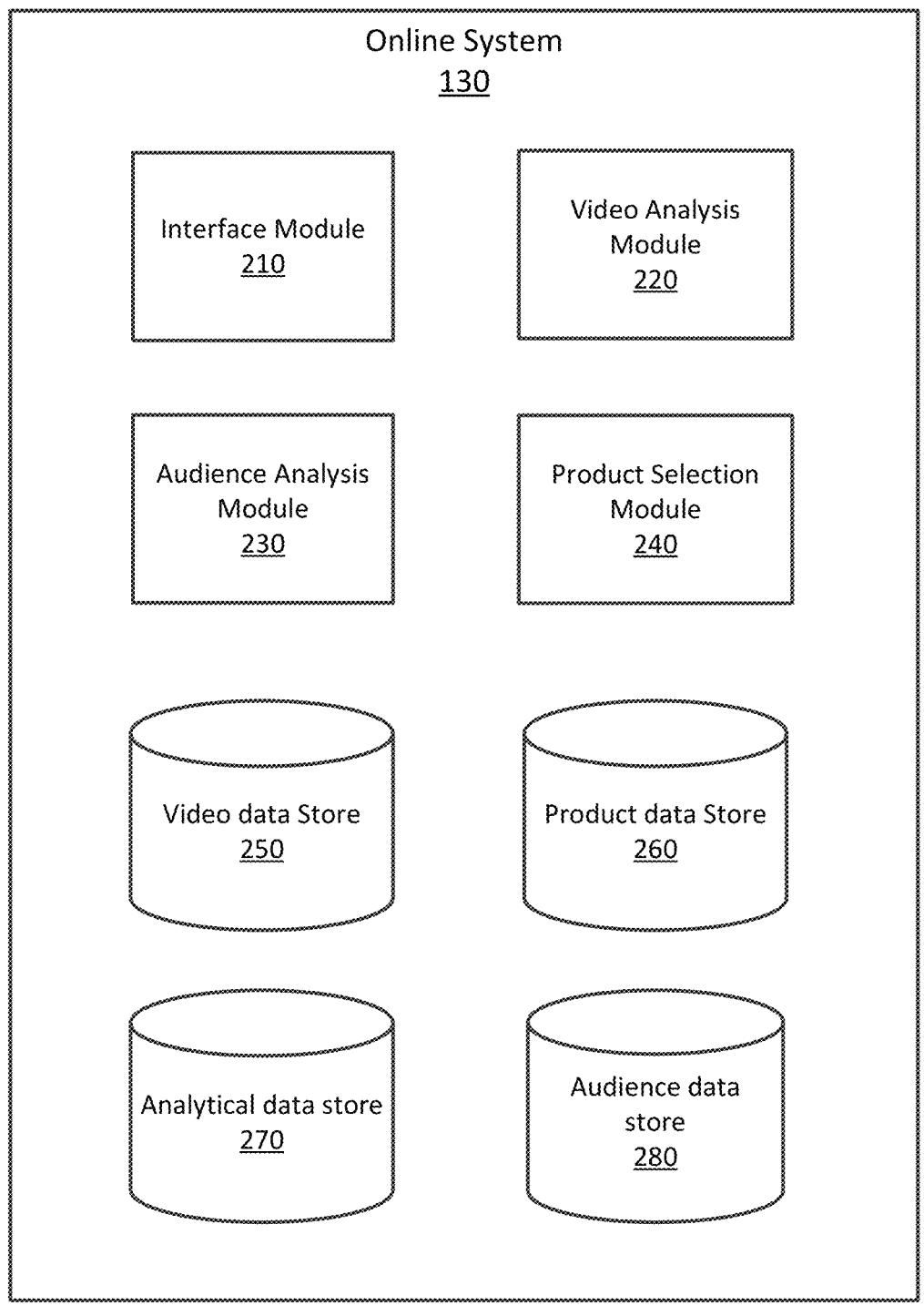
FIG. 2 shows a block diagram of an online system shown in FIG. 1, according to one embodiment.

FIG. 2 shows a block diagram of an online system 130 shown in FIG. 1, according to one embodiment. In FIG. 2, the online system 130 includes an interface module 210, a video analysis module 220, an audience analysis module 230, a product selection module 240, a video data store 250, a product data store 260, an analytical data store 270, and an audience data store 280. The different modules and data stores presented in FIG. 2 shows merely one example, and in alternative embodiments not shown, additional and/or different modules and/or data stores may be included in the online server 130, such as an action log, an edge store and a news feed manager. Likewise, functions performed by the various entities included in FIG. 2 may differ in different embodiments.

An action log (not shown in FIG. 2) of the online system 130 stores user actions internal to and/or external to the online system 130. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log.

An edge store (not shown in FIG. 2) stores information describing connections between users and other objects on the online system 130 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 130, such as expressing interest in a page on the online system, sharing a link with other users of the online system 130, and commenting on posts made by other users of the online system 130. Users and objects within the online system 130 can be represented as nodes in a social graph that are connected by edges stored in the edge store.

In one embodiment, the online system 130 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager (not shown in FIG. 2) may generate stories for presentation to a user based on information in the action log and in edge store or may select candidate stories included in a content store. One or more of the candidate stories are selected and presented to a user by the newsfeed manager.

The interface module 210 generates instructions of displaying a video to a user on a client device of a user along with a scrolling carousel of recommended products that is synchronized with the video such that the products shown in the video or similar products are included in the carousel and the user can select products included in the carousel for purchase. In one embodiment, the interface module 210 receives a video for display to the user as well as a set of recommended products items, and generates instructions to display the recommended products along with the video being watched by the user. The input data related to the video is stored in the video data store 250 while the data related to the recommended products is stored in the product data store 260.

In terms of instructions for displaying the recommended products along with the display of the video on the client device 110 to a user, the interface module 210 may specify which recommended products are to be included in scrolling carousel of products as well as content of selected recommended products, specific presentation styles, formats (e.g., horizontal scrolling, fade-in/fade-off) or locations of the recommended products relative to the display of the video on the same user interface of the client device 110. In terms of categories of content that should be included in the recommended product items, the interface module 210 may determine to include image, brand owner information (e.g., brand name), price, size or additional information of the corresponding recommended product, as more fully described below in FIG. 3A.

In terms of presentation styles or formats, as one example, the interface module 210 may determine to use a scrolling carousel presenting recommended product items. In the scrolling carousel, one recommended product or multiple recommended products associated with detected Q points in the video frames being displayed to the user are included, and a current recommended product may be displayed until a next Q point in a video frame of the video appears. When the next Q point appears in the video frame, the carousel dynamically replaces the recommended product currently being displayed with one or more recommended products that are associated with the next Q point. For example, the carousel automatically scrolls to a first product for one Q point, and then auto-scrolls to a next product for a next Q point such that the user can simply watch the video and see an auto-scroll of products, though the user can click on or hover over a product at any time to get more information about that product. The carousel or other forms of presentation of the recommended products can be presented above, below or next to the display of the video being watched by the user, as more fully described below in FIGS. 3A-3B.

In some embodiments, the interface module 210 also receives audience data from the client device 110, and the audience data is stored in the audience data store 280. In one embodiment, the audience data includes user profile information of the user of the video, and the user profile information may include the user's gender, preferences or personal interest (e.g., purchasing interest) that can be used for selecting recommended products for presentation to the user, where the selected recommended products are selected in accordance with the user's preferences or personal interest.

The interface module 210 also receives detailed product information about recommended products from the content provider system 120, and the product information is stored in the product data store 260. In some embodiments, the interface module 210 also receives information like fashion updates in a past period of time (e.g., the past 24 hours or the past week) from the content provider system 120, and the fashion updates is stored in the analytical data store 270 for the product selection module 240 to determine a trend, allowing better selection of recommended products and better targeting of users of the online system 130, as more fully described below. The content provider system 120 can select the particular products to include in the carousel and indicate these to the online system, or the online system can select which products to include in the carousel.

In some embodiments, the interface module 210 also receives user's request via the client device 110 about the recommended products items displayed to the user, and provides instructions to the client device 110 in response to the user's request. For example, in response to a user's request to purchase a recommended product (e.g., the user may click on a "buy now" button, as more fully described below in FIG. 3A), the interface module 210 provides instructions to the client device 110 for directing the user to an external purchasing webpage that allows the user to pay for the recommended product, and the video currently displayed to the user may or may not be paused while the user is directed to and viewing the purchasing webpage. As another example, in response to a user's request to learn details about a recommended product (e.g., the user may click on the recommended product image, as more fully described below in FIG. 3A), the interface module 210 provides instructions to the client device 110 for directing the user to an official website of the brand owner of the recommended product.

The video analysis module 220 extracts visual features of a video to be displayed for a user and stores the video and its related visual features in the video data store 250. Based on the visual features of the video, the video analysis module 220 detects Q points in the video frames of the video, which identifies one or more objects of interest in the corresponding video frames. An object of interest identified by a Q point can be a potential product that the user is interested to purchase. The determined Q points and related data (e.g., identified objects of interest and video frame index associated with the detected Q points) are stored in the analytic data store 270. In one embodiment, the video analysis module 220 analyzes each video frame of the video and detects whether a video frame includes a Q point. Detailed explanation of the frame-by-frame analysis of Q point detection is described below with reference to FIG. 4.

To determine a Q point in a video frame, the video analysis module 220 may employ both manual-based methods and machine-based analyses. For example, with the manual-based method, a person manually identifies a Q point in a video frame and an object of interest (e.g., shoes with a specific brand worn by a player) associated with the identified Q point. For example, an administrator of the online system 130 watches a video and identifies a player wearing a brand name T-shirt in a video frame. The administrator manually marks the player as the Q point in the video frame and the brand name T-shirt as the corresponding object of interest (e.g., log an entry in a Q-point log). Using the machine-based analyses, the video analysis module 220 uses image processing techniques such as edge detection, Blob extraction, histogram analysis, pixel intensity filtering, gradient filtering, pattern recognition, or scale-invariant feature transform to extract visual features of a video frame of the video. Alternatively, the video analysis module 220 applies an image feature extraction model to extract visual features of a video frame, where the extraction model is trained using asynchronous stochastic gradient descent procedure and a variety of distributed batch optimization procedure on computing clusters a large corpus of training images. The extracted visual features can be used to identify possible objects of interest, e.g., shirts, shoes having specific brand logos in the video frames associated with the identified objects.

Figure 4:
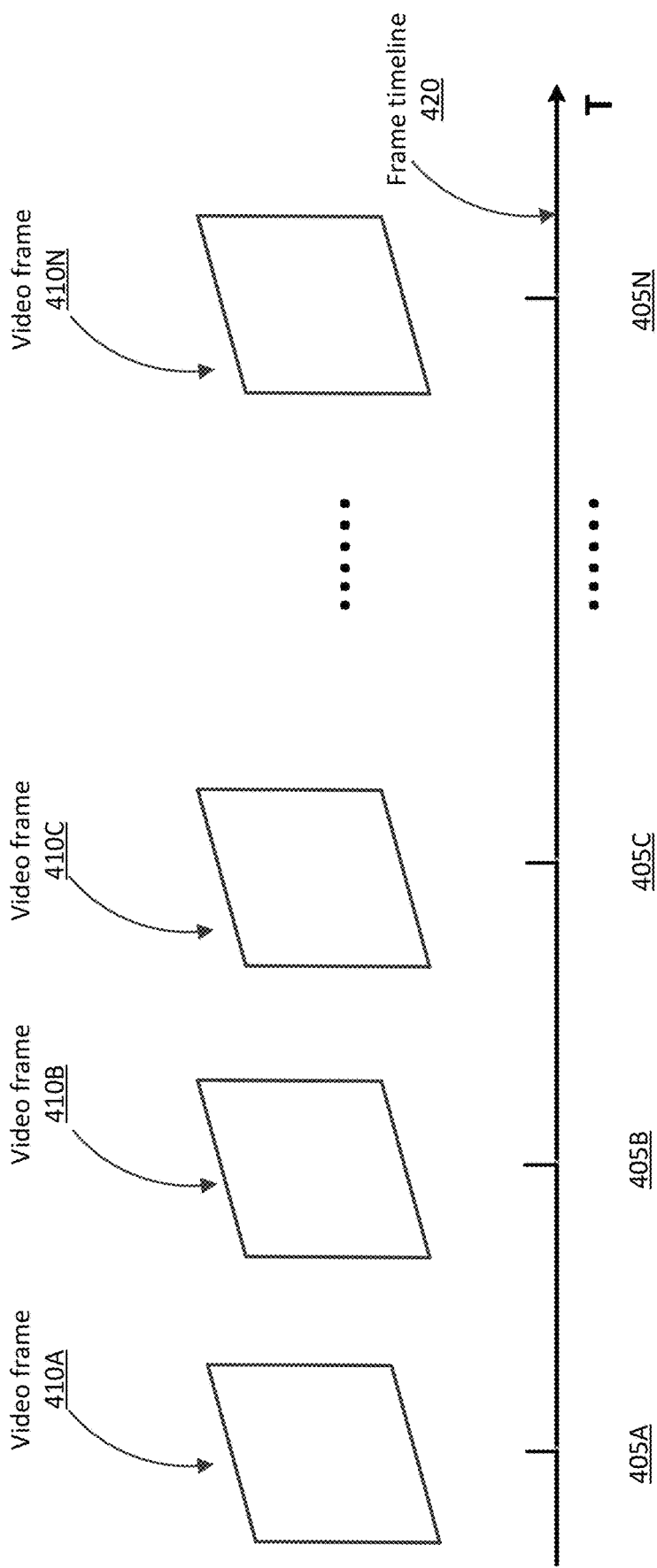
FIG. 4 shows line diagrams illustrating an example of detecting points of interests (also referred to as "Q points") in a video displayed to a user, according to one embodiment.

Turning now to FIG. 4, FIG. 4 shows line diagrams illustrating an example of detecting points of interests (also referred to as "Q points") in a video displayed to a user, according to one embodiment. In FIG. 4, a sequence of video frames 410 (e.g., 410A-410N) corresponding to a sequence of time labels 405 (e.g., 405A-405N) included in a timeline 420 of displaying the video frames the video. The timeline 420 shows, for each video frame 410, a time label 405 indicating a relative location in terms of timestamp of the video frame among the whole sequence of video frames 410. For example, video frame 410A corresponds to time label 405A; video frame 410B corresponds to time label 405B, and video frame 410N corresponds to frame label 405N.

One or more of the video frames 410 may have one or more Q points, and each Q point in a video frame identifies an object of interest in the video frame. For example, the video frame 410C has a Q point that identifies a player detected in the video frame 410C; on the other hand, video frames 410A and 410B do not have Q points because the video frames 410A and 410B capture a start of a soccer game, such as the blue sky over a soccer field. As described above, the video analysis module 220 analyzes the visual features of each video frame to detect Q points using various image processing techniques. Each Q point in a video frame has an index indicating its relative location among other videos frame of the video, e.g., a timestamp or a frame number.

The audience analysis module 230 receives audience data stored in the audience data store 280 that is collected by the interface module 210, and determines preferences and personal interest (e.g., purchasing interest) of a target user. In one embodiment, the audience analysis module 230 determines user preference information directly from the user profile information that is already collected by the interface module 210. For example, the hobbies (e.g., a soccer lover) included in the user profile information may indicate the user is interested in soccer games, and the user may be interested in purchasing soccer jersey, soccer shoes and soccer balls while watching a soccer game video. In another embodiment, the audience analysis module 230 determines user preference information based on collected audience data via machine-based analysis, e.g., using machine learning techniques to train a model based on a corpus of training data related to various types of target audiences.

The product selection module 240 selects recommended products associated with detected Q points from content items provided by content providers and/or products catalog curated by the online system 130. The information about the recommended products, such as images of the recommended products, is stored in the product data store 260. In one embodiment, the product selection module 240 analyzes the objects of interest identified by the detected Q points, product information of candidate products identified by the objects of interest, as well as user profile information included in the audience data associated with the user, and determines recommended products for the synchronized display to the user. For example, based on the identified objects of interest as well as user profile information, the product selection module 240 determines whether a candidate product or similar products can be chosen as a recommended product for presentation to the user. As one example, an object of interest captured in a video frame corresponding to a detected Q point may be a shirt of a very popular brand worn by a male soccer player in a soccer game video. The production selection module 240 selects the same shirt in style and color from the same brand owner and one or more similar shirts in different colors or different brands as recommended products. The production selection module 240 may further selects other related products, such as shirts, shoes, pants for female of this brand based on the user profile information.

In one embodiment, only one recommended product is selected for a single Q point detected in a corresponding video frame; in another embodiment, multiple different recommended products are selected for a single Q point detected in a corresponding video frame. In some embodiments, the recommended products may be the same or share similar characteristics (e.g., same brand and style) with the object of interest identified by the Q point. As one example, one recommended product can be the exact same product of an object of interest (e.g., a soccer jersey worn by a player in the video) identified by a corresponding Q point. As another example, a recommended product can be a product of the same brand but for different gender, e.g., a shift of same style, but for female. In some embodiments, the online system 130 selects recommended products based on user profile information associated with the user watching the video such that the recommended products presented to the user are highly likely to match the user's preference or purchasing interest.

In some embodiments, the product selection module 240 determines a trend based on data related to trends (e.g., collected fashion updates) stored in the analytical data store 270, and selects recommended products based on the trend for synchronized display to the user. In one embodiment, the product selection module 240 determines the trend using a variety of image analysis techniques. As one example, the product selection module 240 analyzes the pictures of dressing (clothes, shoes, jewelries) of celebrities captured in recent fashion events and determines a trend. The product selection module 240 may instruct the interface module 210 for searching and collecting information about suitable content providers (e.g., advertisers) and products that match the determined trend. The product selection module 240 selects recommended products based on the searched result as well as user profile information of a user.

The video data store 250 stores a video that is received by the interface module 210 and that is used by the video analysis module 220 for detecting Q points. In one embodiment, the video data store 250 stores all the video frames of a received video, where the video frames may be indexed by timestamp or frame number. As described above, the content of a video may be associated with a specific theme, e.g., a sports game, or promotion of specific products provided by a content provider. As described above, some video frames of a received video may include Q points and corresponding objects of interest identified by the Q points.

The product data store 260 stores product information of candidate products such as objects of interest determined by the video analysis module 220 and recommended products determined by the product selection module 240. The product information of the candidate products can include information such as product categories (e.g., clothing, food, consumer electronic devices, etc.), brand (e.g., brand name, brand history), released date, prices, sizes, gender as well as additional content items about the products.

The analytical data store 270 stores information about determined Q points and objects of interest identified by the Q points determined by the video analysis module 220, as well as information (e.g., fashion updates) collected by the interface module 210 over a certain period of time (e.g., last week). Each detected Q point includes an index (e.g., timestamp or frame number) of the corresponding video frame having the Q point as well as information of an object of interest identified by the Q point. In one embodiment, information of the object of interest may further include an index of the video frame having the object of interest, object type (e.g., a person, clothes worn by a person, or equipment such as golf club shaft or soccer ball), brand owner, color, etc. The fashion updates stored in the analytical data store 270 are used for determining a trend (a fashion trend) over a period of time, and the fashion updates may be, e.g., images of dressings (e.g., clothes or shoes) of celebrities that are captured by live broadcast or other media, or popular fashion terms specified in newspapers, magazines or fashion shows.

The audience data store 280 stores audience data received by the interface module 210 from the client device 110, and example audience data includes user profile information about the user of the client device 110, such as gender, personal hobbies (e.g., sports or preferred sports types) and additional personal interest (e.g., purchasing interest). The audience data store also 280 stores determined user preferences associated with the user by the audience analysis module 230.

Figure 3:
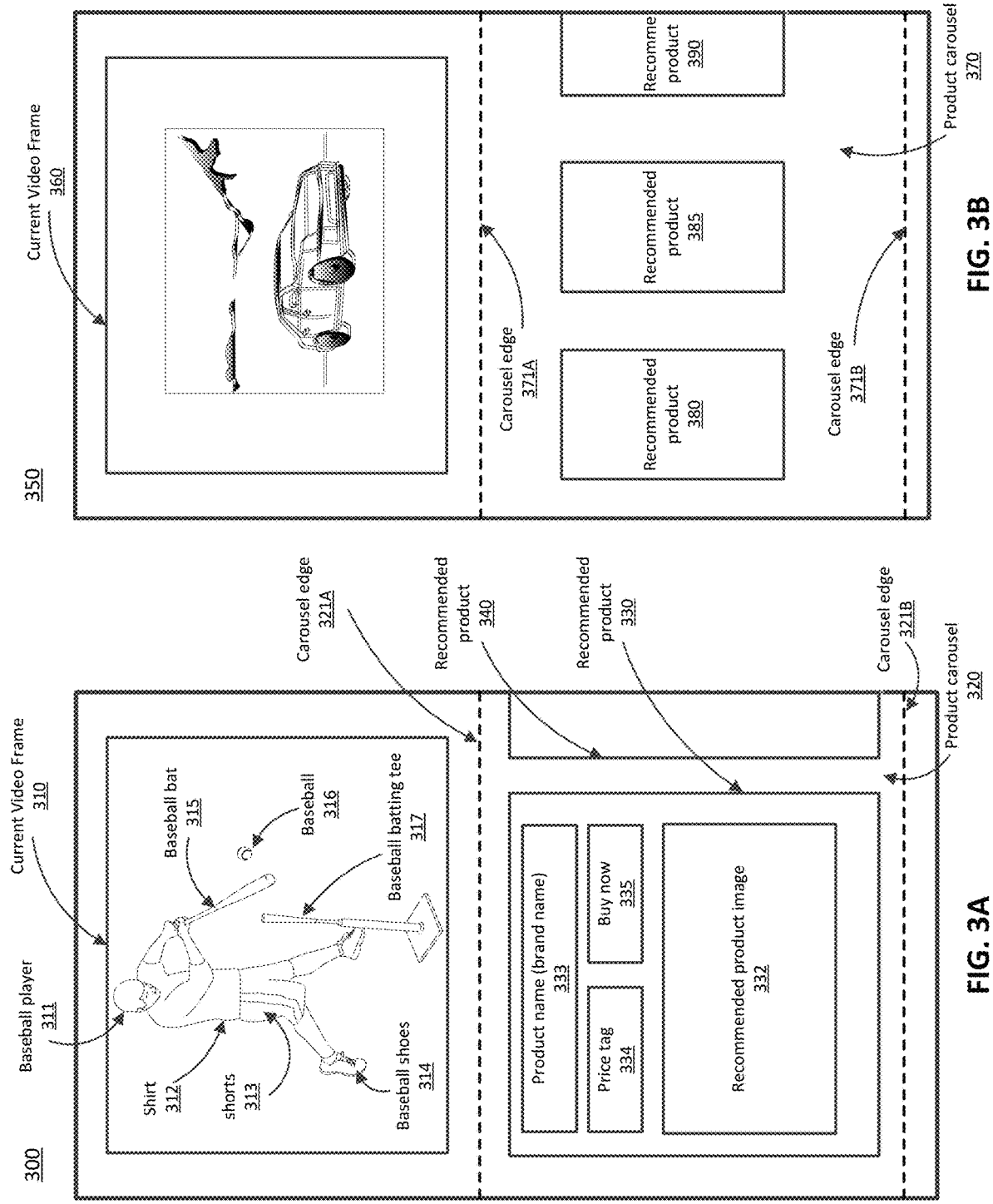
FIG. 3A shows an example user interface presenting a video and recommended products to a user in a synchronized manner, according to one embodiment.
FIG. 3B shows another example user interface presenting a video and recommended products to a user in a synchronized manner, according to one embodiment.

FIGS. 3A-3B show different example user interfaces presenting a video along with recommended products to a user at the same time, according to one embodiment. FIG. 3A shows an example user interface 300 including one recommended product 340 presented when a video frame of the video shows the recommended product. FIG. 3B shows another example user interface 350 including multiple recommended products when a video frame of the video shows one of the recommended product.

In FIG. 3A, the example user interface 300 includes a video represented by its current video frame 310 that occupies a top half of the user interface 300, and a scrolling product carousel 320 that occupies a bottom half of the user interface 300. The current video frame 310 is displayed to a user on the user interface 300. The current video frame 310 of the video shows a baseball player 311, a shirt 312, a pair of shorts 313 and a pair of baseball shoes 314 worn by the baseball player, and equipment such as a baseball bat 315 held by the baseball player 311, a baseball 316 that is travelling away from a baseball batting tee 317 which is used to position the baseball 316 before it was hit by the baseball bat 315.

In some embodiments, the video analysis module 220 analyzes the current video frame and detects the baseball player 311 as the Q point of the current video based on, e.g., object recognition of the current video frame 310. The video analysis module 220 identifies some of or all of the objects corresponding to the detected Q point, including the shirt 312, shorts 313, shoes 314, baseball bat 315, baseball 316 and batting tee 317.

The product selection module 240 selects one or more recommended products associated with the detected Q point as described above. The selected recommended products are included in a scrolling product carousel 320 shown in FIG. 3A, where the recommended products in the product carousel 320 are displayed in synchronization with the display of the video frames of the video such that the objects of interest (e.g., the baseball shirt 312, shorts, 313 and shoes 314) shown in the current video frame are included in the carousel. The scrolling product carousel 320 is one example presentation style for recommended products selected for concurrent display with current video frame of the video. As shown in FIG. 3A, the scrolling product carousel 320 is enclosed by the carousel edge 321A and the carousel 321B with recommended products (e.g., 330 and 340 here) being synchronized shown in a horizontal direction, e.g., from left to right.

A recommended product, e.g., 330 or 340, refers to a content item displayed on the user interface 300. The recommended product is displayed according to the information of the recommended product for synchronized display, for example, recommended product image 332, product name or brand name 333, price tag 334, and a "buy now" button 335 for this recommended product. In some embodiments, the "buy now" button 335 allows the user to be directed to an external shopping cart or check-out webpage for purchasing the product with or without interrupting the currently playing video. As one example, with the currently playing video being paused after the user clicks on the "buy now" button 335, the user can take time to view detailed product information of the recommended product displayed on the check-out webpage before the user determines whether to buy the product. As another example, where the user prefers to finish watching the video without any interruption. In this case, with the currently playing video continuing playing (instead of being paused) after the user clicks on the "buy now" button 335, the recommended product is saved or bookmarked for later viewing.

The scrolling product carousel 320 shown in FIG. 3A presents only one recommended product 330 (e.g., same or similar to the baseball shirt 332) along with current video frame showing the recommended product. The scrolling product carousel 320 also includes a next recommended product, e.g., recommended product 340 (e.g., same or similar to the baseball bat 315), associated with the Q point detected in the next video frame. The next recommended product 340 is presented when the next video frame associated with the next Q point is playing at next time slot. In one embodiment, when changing from the current recommended product (e.g., recommended product item 330) to the next recommended product (e.g., recommended product item 340), the scrolling product carousel 320 may shift or move to the left with an effect of a gradual replacement of the current one (e.g., recommended product item 330) with the next one (e.g., recommended product item 340), such as fading out the image of current recommended product 330 and fading in the image of next recommended product 340. In alternative embodiments not shown, the scrolling product carousel 320 may shift to the right when transitioning from displaying current recommended product to displaying next recommended product.

The presentation of the video 310 as well as the recommended products 330, 340 shown in FIG. 3A is merely one example, and in alternative embodiments not shown, different styles or formats of presentation may be used. As one example, the user interface 300 may have a different presentation format of recommended product instead of using a scrolling product carousel 320 shown in FIG. 3A; the number of recommended products presented for a current video frame may vary, as more fully described below in FIG. 3B. Furthermore, the relative location between the video 310 and recommended products 330 and 340 may vary as long as recommended products associated with the current video frame are presented concurrent with the current video frame. For example, the recommended products may be displayed above, to the left or to the right of the current video frame 310. Additionally, content and/or styles included in a recommended product may vary, and for example, a "bookmark" button (not shown here) that is different from the "buy now" button 335 may be added in the recommended product, allowing the viewing user to conveniently bookmark a recommended product saved for later viewing or navigation.

FIG. 3B shows another example user interface 350 including multiple recommended products presented in synchronization of display of the current video frame 360 of a video being watched by a user, according to one embodiment. Similar to the example user interface 300 shown in FIG. 3A, the user interface 350 also includes a video represented by its current video frame 360 displayed to a user and a product carousel 370 enclosed by the carousel edge 371A and carousel 371B. The current video frame 360 has Q point detected, which identifies an object of interest in the current video frame, e.g., the car. Compared with display of recommended products 330, 340 shown in FIG. 3A, the example user interface 350 shown in FIG. 3B employs a different presentation of recommended products 380, 385, 390 with two of them (i.e., 380 and 385) being presented along with the current video frame 360 because the recommended products 380 and 385 are related to the car shown in the current video frame 360, e.g., the car from the same car manufacturer but in different colors. The scrolling product carousel 370 also includes a next recommended product 390, which is to be presented along with next video frame showing the same or similar product as the next recommended product 390.

Figure 5:
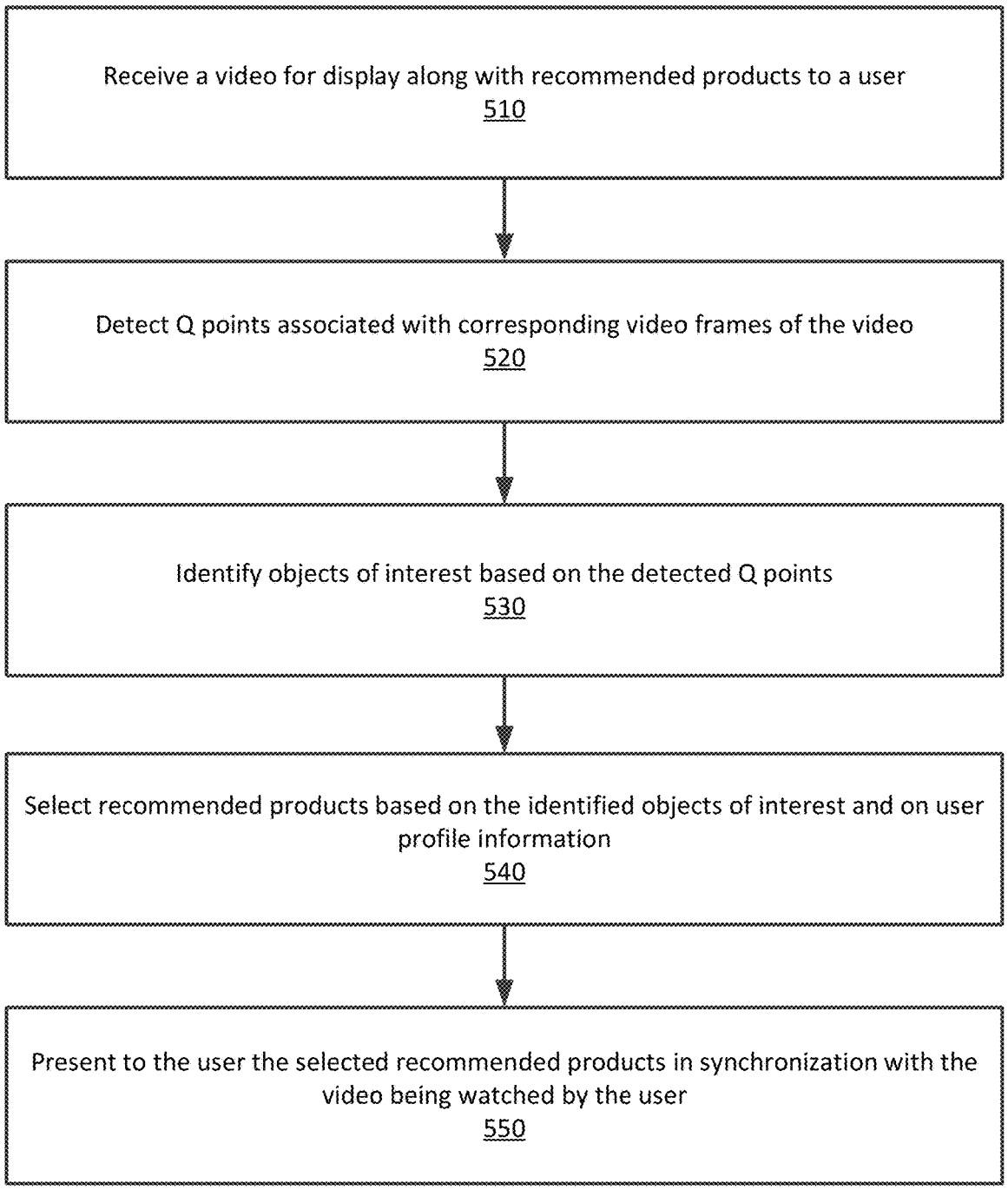
FIG. 5 shows an example flow chart illustrating a process of presenting recommended products associated with a video along with display of a video being watched by a user in a synchronized way, according to one embodiment.

FIG. 5 shows an example flow chart 500 illustrating a process of detecting Q points in a video, selecting and presenting recommended products associated with the detected Q points along with the video being watched by a user, according to one embodiment. Initially, the online system 130 receives 510 a video for display to a user, where the video can be a pre-recorded video from a content provider or a live broadcast video from a content provider. After receiving the video, the online system 130 detects 520 Q points associated with corresponding video frames of the video, e.g., by analyzing each video frame of the video. Each detected Q point in a video frame identifies 530 an object of interest in the video frame, e.g., a player in a baseball game video. The online system 130 selects 540 recommended products that are associated with the identified objects of interest and on user profile information of the user. For example, the online system 130 identifies one or more products associated with the identified object, e.g., T shirt, cap, shorts worn by the identified player and selects one or more products same or similar to the identified products shown in the video frame. The online system 130 may enhance the product selection based on the user profile information such that the online system 130 is able to select recommended products that match the user's preferences (e.g., purchasing interest). The online system 130 includes the recommended products in a scrolling product carousel and presents to the user the recommended product at the same time with the corresponding video frame showing the same or similar product to the user.

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, the method comprising:
   receiving a video for display to a user, the video comprising a plurality of video frames;
   for each video frame:
      analyzing visual features of the video frame; and
      detecting one or more points of interest in the video frame based on the analysis of the visual features of the video frame, a point of interest in the video frame being associated with an object in the video frame, and the object in the video frame being related to one or more different products;
   for each of the identified point of interests in the plurality of video frames, selecting a product of the one or more different products related to the object associated with the point of interest, by:
      analyzing user profile information associated with the user to derive a user preference; and
      selecting the product from the one or more different products based on the derived user preference; and
   providing for display at a display interface:
      a video frame of the plurality of video frames in a first portion of the display interface shown to the user, and
      a scrolling carousel of products located in a second portion of the display interface, the carousel displaying content associated with a selected product for an identified point of interest of the identified points of interest corresponding to the video frame being concurrently displayed to the user in the first portion of the display interface, and wherein the scrolling carousel further concurrently displays a portion of content associated with a next selected product associated with a next video frame of the plurality of video frames containing a point of interest.

2. The method of claim 1, wherein providing for display at the display interface comprises:
   for each video frame currently being displayed to the user:
      determining whether the video frame has a detected point of interest; and
      selecting one or more products associated with the detected point of interest in the video frame.

3. The method of claim 1,
wherein the selected product is same or similar to a product shown in the video frame.

4. The method of claim 1, wherein providing for display the scrolling carousel of products comprises:
displaying one or more tools in the second portion of the display interface, wherein the user interacts with the displayed products through the one or more tools.

5. The method of claim 4, wherein the one or more tools displayed in the second portion of the display interface comprise one of the following:
a purchase tool for the user to purchase the displayed product; and
a bookmark tool for the user to bookmark the displayed product.

6. The method of claim 1, wherein a point of interest in a video frame is identified by one of a timestamp associated with the video frame and frame number of the video frame.

7. The method of claim 1, wherein the selected product associated with the identified point of interest shares one or more characteristics with the object in the video frame associated with the identified point of interest.

8. The method of claim 1, wherein analyzing visual features of the video frame comprises:
applying a trained image feature extraction model to the video frame to extract a plurality of visual features;
identifying an object in the video frame based on the extracted visual features; and
identifying one or more items associated with the identified object, each identified item corresponding to a product that is likely to be of interest to the user.

9. The method of claim 1, wherein the video displayed to the user is one of a pre-recorded video and a broadcast video streamed to the user in real time.

10. A non-transitory computer readable storage medium storing computer program instructions, the computer program instructions when executed by a computer processor causes the processor to perform the steps of:
receiving a video for display to a user, the video comprising a plurality of video frames;
for each video frame:
analyzing visual features of the video frame; and
detecting one or more points of interest in the video frame based on the analysis of the visual features of the video frame, a point of interest in the video frame being associated with an object in the video frame, and the object in the video frame being related to one or more different products;
for each of the identified point of interests in the plurality of video frames, selecting a product of the one or more different products related to the object associated with the point of interest, by:
analyzing user profile information associated with the user to derive a user preference; and
selecting the product from the one or more different products based on the derived user preference; and
providing for display at a display interface:
a video frame of the plurality of video frames in a first portion of the display interface shown to the user, and
a scrolling carousel of products located in a second portion of the display interface, the carousel displaying content associated with a selected product for an identified point of interest of the identified points of interest corresponding to the video frame being concurrently displayed to the user in the first portion of the display interface, and wherein the scrolling carousel further concurrently displays a portion of content associated with a next selected product associated with a next video frame of the plurality of video frames containing a point of interest.

11. The non-transitory computer readable storage medium of claim 10, wherein providing for display at the display interface comprises:
for each video frame currently being displayed to the user:
determining whether the video frame has a detected point of interest; and
selecting one or more products associated with the detected point of interest in the video frame.

12. The non-transitory computer readable storage medium of claim 10,
wherein the selected product is same or similar to a product shown in the video frame.

13. The non-transitory computer readable storage medium of claim 10, wherein providing for display the scrolling carousel of products comprises:
displaying one or more tools in the second portion of the display interface, wherein the user interacts with the displayed products through one or more tools.

14. The non-transitory computer readable storage medium of claim 13, wherein the one or more tools displayed in the second portion of the display interface comprise one of the following:
a purchase tool for the user to purchase the displayed product; and
a bookmark tool for the user to bookmark the displayed product.

15. The non-transitory computer readable storage medium of claim 10, wherein a point of interest in a video frame is identified by one of a timestamp associated with the video frame and frame number of the video frame.

16. The non-transitory computer readable storage medium of claim 10, wherein the selected product associated with the identified point of interest shares one or more characteristics with the object in the video frame associated with the identified point of interest.

17. The non-transitory computer readable storage medium of claim 10, wherein analyzing visual features of the video frame comprises:
applying a trained image feature extraction model to the video frame to extract a plurality of visual features;
identifying an object in the video frame based on the extracted visual features; and
identifying one or more items associated with the identified object, each identified item corresponding to a product that is likely to be of interest to the user.

18. The non-transitory computer readable storage medium of claim 10, wherein the video displayed to the user is one of a pre-recorded video and a broadcast video streamed to the user in real time.

19. The method of claim 1, wherein the scrolling carousel applies a gradual replacement effect to replace the content associated with the selected product with the content associated with the next selected product between display of the video frame and the next video frame.

20. The non-transitory computer readable storage medium of claim 10, wherein the scrolling carousel applies a gradual replacement effect to replace the content associated with the selected product with the content associated with the next selected product between display of the video frame and the next video frame.

* * * * *